United States Patent [19]
Patron et al.

[11] 3,879,360
[45] Apr. 22, 1975

[54] PROCESS FOR THE BULK-POLYMERIZATION OF ACRYLONITRILE

[75] Inventors: Luigi Patron; Alberto Moretti, both of Venezia; Raffaele Tedesco, Mestre; Renato Pasqualetto, Porto Marghera, all of Italy

[73] Assignee: Montedison Fibre S.p.A., Milan, Italy

[22] Filed: Dec. 26, 1973

[21] Appl. No.: 427,852

[30] Foreign Application Priority Data
Jan. 3, 1973 Italy .................................. 19017/73

[52] U.S. Cl...... 260/85.5 R; 260/32.6 N; 260/63 N; 260/79.3 R; 260/82.5; 260/82.7; 260/88.7 F
[51] Int. Cl. ..... C08f 3/76; C08f 15/02; C08f 15/16
[58] Field of Search ......... 260/85.5 R, 85.5 N, 88.7, 260/88.7 F

[56] References Cited
UNITED STATES PATENTS
3,787,365   1/1974   Patron et al. ................. 260/85.5 R

*Primary Examiner*—Harry Wong, Jr.
*Attorney, Agent, or Firm*—Hubbell, Cohen, and Stiefel

[57] ABSTRACT

Free-radical bulk polymerization of acrylonitrile with or without another copolymerizable ethylenically unsaturated monomer, using a free-radical catalytic system having a decomposition rate constant ($K_d$) greater than 1 hr.$^{-1}$ at the polymerization temperature, a reaction time (Q) sufficient to half-decompose the catalyst, and a catalyst concentration equal to or greater than $Q \times 2 \times 10^{-3}$ moles/liter, wherein Q is the residence time expressed in hours is improved by conducting the polymerization in the joint presence of a mercapto compound and a basic nitrogen containing compound.

5 Claims, No Drawings

PROCESS FOR THE BULK-POLYMERIZATION OF ACRYLONITRILE

CROSS-REFERENCE TO RELATED APPLICATION

This application is related to co-pending applications, Ser. No. 136,901, filed Apr. 23, 1971, now U.S. Pat. No. 3,878,365, Ser. No. 290,982, filed Sept. 21, 1972 now U.S. Pat. No. 3,839,288 and Ser. No. 362,315, filed May 21, 1973, now U.S. Pat. No. 3,821,178, all of which are owned by the assignee of the present application, the contents of all of said applications being expressly incorporated herein by reference.

BACKGROUND OF THE INVENTION

1. Field of the Invention

The present invention relates to a process for the bulk polymerization of acrylonitrile, either alone or together with ethylenically unsaturated co-monomers copolymerizable therewith. More particularly, the present invention concerns an improved process for free-radical bulk polymerization of acrylonitrile which process provides a high degree of control of the reaction conditions and the reaction mixture viscosity and results in high polymerization conversions.

2. Description of the Prior Art

Heretofore, the free-radical bulk polymerization of acrylonitrile at room temperature, i.e., about 20°C., or higher temperatures has not been an industrially feasible process.

Primarily, this has been due to the difficulty of (1) finding a catalytic system which is soluble in the monomer and capable of achieving a high degree of efficiency together with easy control of the polymerization reaction, and (2) of finding reaction conditions suitable to maintain the polymerization mixture in a sufficiently fluid state to facilitate mixing the reaction medium and dissipation of the heat generated by the reaction.

Thus, it is well known that the bulk polymerization of acrylonitrile, under certain conditions, can become auto-catalytic, which can lead to loss of control of the polymerization and explosions due to the rapid development of hot spots. The self-catalytic course of this type of reaction is due to the reduction of the rate of chain-termination of the macroradicals resulting from their being trapped in the precipitated polymer. (See W. H. Thomas in "Mechanism of Acrylonitrile Polymerization"— Fortschritte der Hochpolymeren-Forschung, 2nd volume, pages 401–411, 1961.)

The extent of this phenomenon, referred to in the literature as the "gel effect," depends on the degree of swelling of the polymer in the reaction medium and, thus, on its apparent density. Inasmuch as, during the polymerization, the polymerization medium rapidly thickens due to the adsorption of the monomer into the polymer, it becomes increasingly difficult to stir the mixture and dissipate the heat of the reaction. Consequently, the increase of polymerization rate, combined with the contemporaneous increase in viscosity of the polymerization medium, causes the temperature to rise, which in turn further increases the reaction rate. Thus, the polymerization gradually gets out of control and often results in an explosion.

It is known that this catalytic effect of the precipitated polymer on the polymerization rate increases proportionally with the concentration of the catalyst. (See C. H. Bamford, W. C. Barb, A. D. Jenkins, and P. F. Onyon — "The Kinetics of Vinyl Polymerization by Radical Mechanism"— Butterworts 1958, page 113).

Kinetically expressed, the polymerization rate (Rp) is dependent on the concentration (C) of the catalyst according to the equation:

$$Rp = K(C)^\alpha$$

wherein, K is a constant, while $\alpha$ ranges from 0.7 to 0.9, instead of being equal to 0.5 as in the case of non self-catalytic polymerizations. (See C. H. Bamford, W. G. Barb, A. D. Jenkins, and P. F. Onyon — Supra, and C. H. Bamford, and A. D. Jenkins, Proc. Roy. Soc., London Ser. A. 216,515, 1953).

In the bulk polymerization of acrylonitrile catalyzed by benzoyl peroxide or azo-bis-iso-butyronitrile, values for $\alpha$ of 0.75 and 0.82, respectively, have been observed. (See W. M. Thomas, J. Polymer Sci., n. 13, page 329, 1954). These values indicate the self-catalytic nature of the polymerization reaction.

Previously, the industrial scale bulk polymerization of acrylonitrile had been considered unfeasible because the process could be controlled only at low initiation rates and with small quantities of reaction monomer. (See W. H. Thomas, "Mechanism of Acrylonitrile Polymerization"— Fortschritte der Hochpolymeren-Forschung, volume 2, page 410, 1961).

As is evident from the foregoing, the temperature of such processes must be controlled by the continuous removal of the heat of polymerization. For this purpose it is necessary, especially when large reactors are used, to maintain the viscosity of the polymerization medium at low levels. That is to say, it is necessary to operate under such conditions as to minimize the amount of monomer absorbed by the polymer.

Although it is recognized that in order to minimize the monomer adsorption the polymer must possess a compact structure, generally accompanied by a high apparent density, methods for accomplishing this, particularly on an industrial scale, had not been available.

To some degree, these problems have been overcome by the methods disclosed in the above mentioned U.S. patents. Thus, it is known that the bulk polymerization of acrylonitrile may be carried out, under controlled temperature conditions and in a fluid polymerization medium, only when the polymerization is conducted according to specific operational conditions. Said conditions are, substantially:

a. polymerization of the acrylonitrile alone or in admixture with up to about 50 mol percent of at least one other ethylenically unsaturated monomer copolymerizable therewith according to either a continuous or a semi-continuous polymerization procedure;

b. the use of a free-radical catalyst system having a decomposition rate constant (Kd) greater than 1 hr.$^{-1}$;

c. a residence time (Q) at least sufficient to half-decompose the catalyst; and d. a concentration of catalyst at least equal to $2 \times 10^{-3} \times Q$ moles/liter, wherein Q is the residence time in hours. When the polymerization is carried out using a continuous procedure, the reaction time is such that $Q \times Ka \geqslant 1$. Among the free-radical catalysts having a high decomposition rate constant, the above idientified U.S. patents disclose catalytic systems consisting of an organic hydroperoxide, an oxidizable sulphoxy compound or sulphur dioxide and a nucleophilic compound such as water, methyl alcohol, ethyl alcohol or higher alcohols. As organic hydroperoxides there may conveniently be used: cumene hydroperoxide, tert-butyl-hydroperoxide or cyclohexanone-hydroperoxide.

Another catalyst system suggested for such a polymerization is: the above organic hydroperoxide and a monoester of sulphurous acid having the general formula:

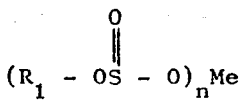

wherein $R_1$ is al alkyl, cycloalkyl, aryl an alkylaryl group having from 1 to 12 carbon atoms; Me is a metal of the first or second group of the Periodic System, ammonium ion or aluminum and $n$ is 1, 2 or 3, depending on the valence of Me. A still further catalyst system consists of an organic hydroperoxide, a magnesium alcoholate in which the alkyl radical may have a linear or branched chain with from 1 to 6 carbon atoms and a dialkyl sulphite of the general formula:

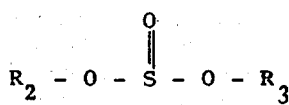

wherein $R_2$ and $R_3$ are independently selected from the group consisting of unsubstituted or substituted $C_1$–$C_{12}$ alkyl radicals, or an unsubstituted or substituted cycloalkyl radical having up to 12 carbon atoms.

As is known, generally, in all polymerizations, the molecular weight of the obtained polymer may be regulated by varying the concentration of the catalyst used. However, this method of controlling the molecular weight of the polymer presents certain disadvantages when the catalyst used is one of the above mentioned systems.

In fact, by varying the concentration of such catalysts, not only is a variation of the molecular weight of the polymer effected, but also, a modification of the dyeing properties of the polymer occurs. That is, if the catalyst concentration is increased in order to lower the molecular weight of the polymer, there will contemporaneously be obtained an increase in the terminal acid groups (expressed as equivalent/g of polymer) bound to the polymeric chain. This presents certain problems in the case where the polymer is intended for the production of fibers, filaments or films requiring well defined tinctorial properties.

For such applications, it is very useful to be able to vary the molecular weight of the polymer while maintaining the dyeing properties of the latter constant, that is, by maintaining constant the acid terminal groups.

It is known that the molecular weight of the polymer can be lowered without varying the content of acid groups, by adding to the polymerization medium suitable transfer agents such as mercapto compounds. These compounds, when added to a polymerization reaction mixture containing a catalyst system based on an organic hydroperoxide of the type described above, show, however, a very limited effect, as appears from the following Table I.

TABLE I

| 2-mercaptoethanol ppm | Average numerical molecular weight of polymer |
|---|---|
| 0 | 45,000 |
| 500 | 45,400 |
| 1,000 | 44,800 |
| 2,000 | 42,000 |
| 3,000 | 40,000 |

The results given in Table I were obtained by carrying out a continuous polymerization of a mixture consisting of 82 percent by weight of acrylonitrile and 18 percent by weight of vinyl acetate, with a water content of 0.3 percent, at 45°C. and with a contact time of 30 minutes, in the presence of 0.25 percent of cumene hydroperoxide and 0.5 percent of $SO_2$, all these percentages being expressed by weight with respect to the mixture of monomers.

The average numerical molecular weight of the polymer (PM) is determined by the intrinsic viscosity [$\eta$] expressed in dl/gm according to the equation:

$$[\eta] = 4.9 \times 10^{-4} (\overline{PM})^{0.75} \qquad (1)$$

wherein the intrinsic viscosity [$\eta$] is measured at 25°C. in dimethylformamide.

SUMMARY OF THE INVENTION

It is an object of the present invention to overcome the problems encountered in the known prior art processes as well as in the processes disclosed in the above mentioned U.S. patents.

This object has been achieved in the present invention which is based on the discovery that in the bulk polymerization of acrylonitrile under the above described polymerization conditions and by using a catalyst system based on an organic hydroperoxide, of the indicated type, a surprising chain-transfer effect is obtained when the polymerization is carried out in the presence of a mercapto compound and a basic nitrogen containing compound in an amount of not more than 2 percent by weight with respect to the monomer.

The combined effect of the mercapto compound and the basic nitrogen containing compound in the bulk polymerization of acrylonitrile under the above indicated conditions is wholly unexpected if one considers that the mercapto compounds alone have almost no effect whatever, as is shown in Table I, while the basic nitrogen containing compound not only does not act as a chain transfer agent, but even causes an increase in molecular weight of the polymer, as appears from the data in the following Table II, in which dimethylacetamide is used as a basic nitrogen containing compound.

TABLE II

| Dimethylacetamide concentration in % by weight with respect to the monomers | Average numerical molecular weight of polymer |
|---|---|
| 0 | 45,000 |
| 0.04 | 50,000 |
| 0.08 | 66,000 |
| 0.16 | 68,000 |
| 0.32 | 86,000 |
| 0.64 | 110,000 |

The polymerization conditions are those recited in connection with the data in Table I and the average numerical molecular weight of the polymer was determined from the intrinsic viscosity according to equation (1).

In the following Table III there are given data showing the surprising chain-transfer results obtained by conjointly using the two above mentioned types of compounds, i.e., mercapto compounds and basic nitrogen containing compounds.

TABLE III

| 2-mercapto-ethanol in ppm | Dimethylacetamide in wt.% with respect to the monomer | Average numerical molecular weight of obtained polymer |
| --- | --- | --- |
| 0 | 0 | 45,000 |
| 500 | 0.08 | 43,000 |
| 1,000 | 0.08 | 25,000 |
| 500 | 0.16 | 42,000 |
| 1,000 | 0.16 | 15,000 |
| 1,000 | 0.64 | 12,000 |
| 1,000 | 1.0 | 10,000 |

The polymerization conditions are those given above in connection with the data in Tables I and II, and the average numerical molecular weight of the polymer was determined from the intrinsic viscosity according to equation (1).

Among the mercapto compounds which may be used in the invention, there are included those compounds of the general formula $R_4-SH$, wherein $R_4$ is a linear or branched chain aliphatic radical having from 1 to 20 carbon atoms, optionally containing in the chain, an —OH or —SH group.

Among these compounds the following may be mentioned: n-propyl-mercaptan, n-butyl-mercaptan, n-octyl-mercaptan, n-decyl-mercaptan, n-dodecyl-mercaptan, n-hexadecyl-mercaptan, 2-mercapto-ethanol, 3-mercapto-propanol, and the like, ethanedi-thiol, propane-dithiol and the like.

The most preferred mercapto-compounds are those wherein $R_4$ is a linear or branched chain alkyl group having from 2 to 12 carbon atoms. The mercapto compounds are admixed in the polymerization medium in amounts of not more than about 3,000 ppm. Amounts between about 500 and 1,500 ppm yield the best results.

Among the basic nitrogen containing compounds which may be used in the invention, there are included amides of the following general formula:

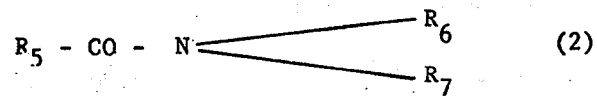

$$R_5 - CO - N \begin{matrix} R_6 \\ R_7 \end{matrix} \quad (2)$$

wherein $R_5$, $R_6$ and $R_7$ are independently selected from the group consisting of hydrogen or alkyl groups having from 1 to 6 carbon atoms. Among these, dimethyl formamide and dimethyl acetamide are particularly preferred. In practice it is preferred to use either one or the other of the two amides, depending on the type of solvent used in the subsequent spinning of the obtained polymer. Thus, when dimethyl acetamide is used as a spinning solvent, it is preferable to carry out the polymerization in the presence of small quantities of said amide.

Instead of the amides of the above general formula (2), there may also be used an aliphatic, cycloaliphatic or an aromatic, primary, secondary or tertiary amine such as: triethylamine, tributylamine, dimethylamine, cyclohexylamine, pyridine, etc.

The amount of basic nitrogen containing compound in general is not more than 2 percent by weight with respect to the monomer or mixture of monomers, and is preferably between 0.1 and 1 percent by weight.

It is expressly pointed out that at these concentrations, the compounds generally used as spinning solvents of acrylic polymers, do not exert any solvent or plasticizing action. In fact, it is known that for such an effect the concentration of the compound that acts as a solvent much be greater than 2 percent.

The polymerization may be carried out in a continuous or semi-continuous way, at a temperature between room temperature, i.e., about 20°C. and the boiling temperature of the monomer or mixture of monomers. The selected polymerization temperature is controlled by conventional means, for example by placing the reactor into a thermostatically stabilized bath or by circulating a cooling fluid around the walls of the reactor or in coils within the reactor, or by removing the heat of reaction by internal evaporation of the reaction medium.

It is preferable to carry out the polymerization in the absence of oxygen which has an inhibiting effect on the polymerization.

Among the ethylenically unsaturated monomers copolymerizable with acrylonitrile, may be listed: alkyl-, aryl- and cycloalkylacrylates such as: methyl acrylate, ethyl acrylate, isobutylacrylate, etc.; alkyl-, aryl- and cycloalkyl-methacrylates such as: methyl methacrylate, ethyl methacrylate, butyl methacrylate, etc.; unsaturated ketones, vinyl esters such as: vinyl acetate, vinyl propionate, etc. styrene and alkyl derivatives thereof, vinyl chloride or vinylidene chloride, vinylfluoride, vinyl- and vinylidene bromide, methacrylonitrile, butadiene and the like.

The process of this invention allows one to obtain both the desired dyeing properties independently of the molecular weight of the polymer, as well as to considerably improve the fluidity of the polymerization mass, as can be seen from the data in Table IV.

The results set forth in Table IV were obtained by polymerization of a mixture consisting of 82 percent of acrylonitrile and 18 percent of vinylacetate, with a water content of the mixture of 0.3 percent by weight, in the presence of 0.5 percent by weight of $SO_2$ and varying quantities of cumene hydroperoxide as indicated in the table. The residence time of the monomers in the reactor was 30 minutes and the polymerization temperature was 45°C. The percentages are expressed by weight with respect to the mixture of monomers.

TABLE IV

| Concentration of cumene hydroperoxide % | Concentration of dimethylacetamide % | Concentration of 2-mercapto-ethanol in ppm | Average numerical molecular weight of polymer | Sulphonic acid groups | Viscosity of the polymerization medium in poises |
| --- | --- | --- | --- | --- | --- |
| 0.05 | — | — | 120,000 | 15 | 6.5 |
| 0.10 | — | — | 71,000 | 19.5 | 3.2 |
| 0.25 | — | — | 45,000 | 33 | 2.0 |
| 0.25 | 0.08 | 500 | 43,000 | 33 | 0.6 |
| 0.25 | 0.08 | 1,000 | 25,000 | 33 | 0.1 |
| 0.25 | 0.64 | 1,000 | 12,000 | 33 | 0.05 |

The sulphonic acid groups are expressed in milliequivalents per kg. of polymer and for their determination a solution of 1 percent by weight of polymer is prepared in dimethylformamide.

This solution is passed through an ion-exchange column containing two equal and separated quantities of: Amberlite IR 120 (cationic resin) in the upper part and Amberlite IR 410 (anionic resin) in the lower part. The height of the column is 50 cm, while the inner diameter is equal to 1.9 cm. The titration of the sulphonic acid groups of the polymer is carried out directly in dimethylformamide solution with a methanol solution of a quaternary ammonium containing basic compound.

The titration is carried out potentiometrically using a platinum electrode.

The polymers or copolymers obtained by the process of this invention display a high apparent density and improved chemical-physical properties.

Moreover, these polymers and copolymers are well suited for conversion into fibers of improved whiteness and thermal stability.

DESCRIPTION OF THE PREFERRED EMBODIMENTS

The following examples are given to more clearly illustrate the invention without being limitative thereof.

EXAMPLE 1

Into a 2.5 liter polymerization reactor, fitted with a stirrer, a thermometer and overflow pipe, and pre-loaded to half its volume with a mixture consisting of 82 percent of acrylonitrile and 18 percent vinylacetate (water content of mixture = 0.3 percent), and heated to 45°C., there were continuously fed in:

8.0 gm/hr of cumene hydroperoxide
  20 gm/hr of gaseous $SO_2$
  3.2 gm/hr of dimethylacetamide
  4.0 gm/hr of 2-mercaptoethanol.

After the first 10 minutes, the monomer mixture was fed in at the a rate of 4,000 gm/hr.

The polymer conversion amounted to 44 percent.

The polymer, which was gathered under stationary conditions, that is, after a period of 2.5 hrs., was filtered, washed with water and dried for 24 hours at 60°C., had the following characteristics:

| | | |
|---|---|---|
| Intrinsic viscosity | | = 1.3 dl/gm |
| Sulphonic groups in milliequivalents/kg of polymer | | = 30 |
| Apparent density | | = 0.52 gm/cc |
| Copolymerized vinylacetate | | = 7.4% |
| Color of polymer = | PI | = 99.2 |
| | B | = 96.0 |

The color is measured by means of the General Electric Spectrophotometer Integrator according to the C.I.E. system of measurement and representation of the color.

According to this system, the color is expressed as purity index (PI) and as brightness (B) both referred to a Standard Lighting which is an emission source corresponding to a black body heated to 6,2000°K.

By way of comparison, if the polymerization is conducted under the above indicated conditions, but in the absence of dimethylacetamide and 2-mercaptoethanol, a copolymer is obtained which will have an intrinsic viscosity of 1.6 dl/gm, containing 30 meq/kg of polymer of sulphonic groups and having a color corresponding to a PI = 98.6 and B = 95.0.

EXAMPLE 2

Operating according to example 1, a 2.5 liter reactor, pre-loaded to half its volume with a mixture of 82 percent of acrylonitrile and 18 percent vinylacetate, was continuously fed with:

10 gm/hr of cumene hydroperoxide
  20 gm/hr of gaseous $SO_2$
  2.96 gm/hr of dimethylacetamide and
  2 gm/hr of ethandithiol.

The polymerization conversion amounted to 42 percent and the copolymer thus obtained had the following characteristics:

| | | |
|---|---|---|
| Intrinsic viscosity | | = 1.1 dl/gm |
| Sulphonic groups in meq/kg of polymer | | = 32 |
| Apparent density | | = 0.5 gm/cc |
| Copolymerized vinylacetate | | = 7.4% |
| Color of polymer = | PI | = 99.3 |
| | B | = 95.9 |

EXAMPLE 3

Operating under the same conditions and with the same quantities indicated in example 2, with the exception that instead of 2 gm/hr of ethandithiol were fed 2.4 gm/hr of n-butylmercaptan, a conversion of 43 percent was attained, while the copolymer thus obtained showed the following characteristics:

| | | |
|---|---|---|
| Intrinsic viscosity | | = 1.2 dl/gm |
| Sulphonic groups in meq/kg of polymer | | = 33 |
| Apparent density | | = 0.51 gm/cc |
| Copolymerized vinylacetate | | = 7.4% |
| Color of polymer = | PI | = 99.1 |
| | B | = 96.2 |

EXAMPLE 4

Operating according to example 2, and by feeding 5 gm/hr of n-dodecylmercaptan instead of 2 gm/hr of ethandithiol, there was attained a polymerization conversion of 43 percent and the obtained copolymer had the following characteristics:

| | | |
|---|---|---|
| Intrinsic viscosity | | = 1.2 dl/gm |
| Sulphonic groups in meq/kg of polymer | | = 32 |
| Apparent density | | = 0.49 gm/cc |
| Copolymerized vinylacetate | | = 7.4% |
| Color of polymer = | PI | = 99.1 |
| | B | = 96.1 |

EXAMPLE 5

Operating under the same conditions as set forth in example 1, the following ingredients were continuously fed into the reactor:

10 gm/hr of cumene hydroperoxide
  20 gm/hr of gaseous $SO_2$
  2.4 gm/hr of dimethylformamide and
  2 gm/hr of 2-mercaptoethanol.

The polymerization conversion amounted to 42 percent and obtained copolymer had the following characteristics:

| | |
|---|---|
| Intrinsic viscosity | = 1.1 dl/gm |
| Sulphonic groups in meq/kg of polymer | = 32 |
| Apparent density | = 0.5 gm/cc |
| Color of polymer = [PI | = 99.0 |
| B | = 96.0 |

EXAMPLE 6

This example was carried out under the same conditions indicated in example 1, by continuously feeding into a reactor, pre-loaded to half its volume with a mixture consisting of 91 percent acrylonitrile and 9 percent of methyl acrylate (water content of the mixture = 0.3 percent) and heated to 40°C.:

10 gm/hr cumene hydroperoxide
20 gm/hr gaseous $SO_2$
3.2 gm/hr dimethylacetamide, and
4 gm/hr 2-mercaptoethanol.

The polymerization conversion amounted to 47.5 percent and the obtained copolymer had the following characteristics:

| | |
|---|---|
| Intrinsic viscosity | = 1.3 dl/gm |
| Sulphonic groups in meq/kg of polymer | = 33 |
| Apparent density | = 0.52 gm/cc |
| Copolymerized methylacrylate | = 7.44% |
| Color of polymer = [PI | = 99.3 |
| B | = 96.2 |

EXAMPLE 7

This example was carried out under the same conditions indicated in example 1, by continuously feeding into the reactor, pre-loaded to half its volume with acrylonitrile and heated to 40°C.:

10 gm/hr cumene hydroperoxide
120 gm/hr gaseous $SO_2$
3.2 gm/hr dimethylacetamide, and
8.0 gm/hr 2-mercaptoethanol.

After the first 10 minutes, the acrylonitrile was fed to the reactor at a rate of 4,000 gm/hr. The polymerization conversion amounted to 54.6 percent, and the obtained polymer had the following characteristics:

| | |
|---|---|
| Intrinsic viscosity | = 2.0 dl/gm |
| Sulphonic groups in meq/kg of polymer | = 24 |
| Apparent density | = 0.48 |
| Color of polymer = [PI | = 99.0 |
| B | = 95.0 |

EXAMPLE 8

This example was carried out under the same conditions and with the same mixture of monomers as set forth in example 1, by feeding into the reactor:

7.2 gm/hr of cumene hydroperoxide
56 cc of a 10 percent sodium-methyl-sulphite solution in methyl alcohol
1.92 gm/hr dimethylacetamide, and
6 gm/hr of 2-mercaptoethanol After the first 10 minutes, the mixture of monomers was fed to the reactor at a rate of 2,400 gm/hr. The polymerization conversion amounted to 50.6 percent, and the obtained copolymer had the following characteristics:

| | |
|---|---|
| Intrinsic viscosity | = 1.5 dl/gm |
| Sulphonic groups in meq/kg of polymer | = 28 |
| Apparent density | = 0.59 gm/cc |
| Color of polymer = [PI | = 99.0 |
| B | = 96.0 |

Variations can, of course, be made without departing from the spirit of our invention.

Having thus described the invention, what is desired to secure and claim by Letters Patent is:

1. In a process for the bulk polymerization of acrylonitrile or a mixture of acrylonitrile with up to about 50 mol percent of at least one other ethylenically unsaturated monomer copolymerizable therewith, which comprises carrying out the polymerization using:
   a. a continuous or semi-continuous polymerization procedure,
   b. a free-radical catalyst system having a decomposition rate constant (Kd) greater than 1 hr.$^{-1}$ and selected from the group consisting of: (1) an organic hydroperoxide, an oxidizable sulphoxy compound, or sulphur dioxide and a nucleophilic compound; (2) an organic hydroperoxide and a monoester of sulphurous acid; and (3) an organic hydroperoxide, a magnesium alcoholate and a dialkyl sulphite;
   c. a residence time (Q) at least sufficient to half-decompose the catalyst, and
   d. a catalyst concentration at least equal to $2 \times 10^{-3} \times Q$ moles/liter, wherein (Q) is the residence time in hours; an improvement according to which the polymerization is carried out in the co-presence of not more than 3,000 ppm, based on the weight of the monomers, of a mercapto compound having the general formula:

$$R_4\text{—SH}$$ 

wherein $R_4$ is a linear or branched chain aliphatic radical having from 1 to 20 carbon atoms and optionally containing in the chain, an —OH or —SH group, and not more than 2 percent by weight, based on the weight of the monomers, of a basic nitrogen containing compound selected from the group consisting of an amide of the formula:

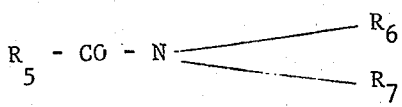

wherein $R_5$, $R_6$ and $R_7$ are independently selected from the group consisting of hydrogen and an alkyl group having from 1 to 6 carbon atoms and an aliphatic, cycloaliphatic or aromatic, primary, secondary or tertiary amine.

2. A process according to claim 1, wherein $R_4$ is an alkyl radical having from 2 to 12 carbon atoms.

3. A process according to claim 1, wherein the basic nitrogen containing compound is dimethylformamide or dimethylacetamide.

4. A process according to claim 1, wherein the amount of the basic nitrogen containing compound is between 0.1 and 1 percent by weight.

5. A process according to claim 1, wherein the polymerization temperature is between about 20°C. and the boiling temperature of the monomer or mixture of monomers.

* * * * *